US010313839B2

(12) United States Patent
Hwang et al.

(10) Patent No.: US 10,313,839 B2
(45) Date of Patent: Jun. 4, 2019

(54) METHOD AND APPARATUS FOR ALLOCATING RESOURCES FOR V2X COMMUNICATION

(71) Applicant: Samsung Electronics Co., Ltd, Gyeonggi-do (KR)

(72) Inventors: Won-Jun Hwang, Gyeonggi-do (KR); Hyun-Seok Ryu, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 15/269,981

(22) Filed: Sep. 20, 2016

(65) Prior Publication Data

US 2017/0086028 A1    Mar. 23, 2017

(30) Foreign Application Priority Data

Sep. 18, 2015  (KR) .................. 10-2015-0132171

(51) Int. Cl.
*H04W 4/02* (2018.01)
*H04W 72/02* (2009.01)
*H04W 72/04* (2009.01)
*H04W 76/14* (2018.01)

(52) U.S. Cl.
CPC .......... *H04W 4/027* (2013.01); *H04W 72/02* (2013.01); *H04W 72/048* (2013.01); *H04W 76/14* (2018.02)

(58) Field of Classification Search
CPC .............................. H04W 4/027; H04W 72/02
USPC ...................................... 455/452.1
See application file for complete search history.

(56) References Cited

U.S. PATENT DOCUMENTS

| 8,521,168 B1* | 8/2013 | Sigg ..................... H04W 28/26 455/436 |
| 2015/0043398 A1 | 2/2015 | Fwu et al. |
| 2015/0215767 A1* | 7/2015 | Siomina .................. H04W 8/02 455/435.2 |
| 2015/0245397 A1* | 8/2015 | Sachs .................. H04W 76/023 455/426.1 |

OTHER PUBLICATIONS

Francois Baccelli, et al., "On the Decision of Device-to-Device Autonomous Discovery", IEEE, Jan. 2, 2012, 9 pages.

\* cited by examiner

*Primary Examiner* — Chuck Huynh

(57) ABSTRACT

Disclosed are a method, communication scheme and a system thereof for converging an IoT technology and a 5G communication system for supporting a high data transmission rate beyond that of a 4G system. The method, communication scheme and a system can be applied to intelligent services (for example, services related to a smart home, smart building, smart city, smart car, connected car, health care, digital education, retail business, security, and safety) based on the 5G communication technology and the IoT-related technology. A method for allocating resources for D2D communication by a User Equipment (UE) includes: identifying a movement direction of the UE; selecting a resource pool mapped to the identified movement direction among resource pools allocated according to the movement direction; and performing D2D communication using the selected resource pool.

20 Claims, 10 Drawing Sheets

METHOD AND APPARATUS FOR ALLOCATING RESOURCES FOR V2X COMMUNICATION

CROSS-REFERENCE TO RELATED APPLICATION(S) AND CLAIM OF PRIORITY

The present application is related to and claims priority under 35 U.S.C. § 119(a) to Korean Application Serial No. 10-2015-0132171, which was filed in the Korean Intellectual Property Office on Sep. 18, 2015, the entire content of which is hereby incorporated by reference.

TECHNICAL FIELD

The present disclosure relates to a method and an apparatus for allocating resources for V2X communication.

BACKGROUND

In order to meet wireless data traffic demands that have increased after $4^{th}$ Generation (4G) communication system commercialization, efforts to develop an improved 5G communication system or a pre-5G communication system have been made. For this reason, the 5G communication system or the pre-5G communication system is called a beyond 4G network communication system or a post Long Term Evolution (LTE) system.

In order to achieve a high data transmission rate, an implementation of the 5G communication system in a mm Wave band (for example, 60 GHz band) is being considered. In the 5G communication system, technologies such as beamforming, massive Multi-Input Multi-Output (MIMO), Full Dimensional MIMO (FD-MIMO), array antenna, analog beam-forming, and large scale antenna are discussed to mitigate propagation path loss in the mmWave band and increase propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and received interference cancellation to improve the system network have been developed for the 5G communication system.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. Internet of Everything (IoE) technology may be an example of a combination of the IoT technology and big data processing technology through a connection with a cloud server.

In order to implement the IoT, research is being conducted on technical factors such as a sensing technique, wired/wireless communication and network infrastructure, service interface technology, and security technology are required, and thus technologies such as a sensor network, Machine to Machine (M2M), Machine Type Communication (MTC), and the like for a connection between objects.

In an IoT environment, through collection and analysis of data generated in connected objects, an intelligent Internet Technology (IT) service to create a new value for people's lives may be provided. The IoT may be applied to fields, such as a smart home, smart building, smart city, smart car, connected car, smart grid, health care, smart home appliance, or high-tech medical service, through the convergence of the conventional Information Technology (IT) and various industries.

Accordingly, various attempts to apply the 5G communication to the IoT network are made. For example, 5G communication technologies such as a sensor network, Machine to Machine (M2M), and MTC are implemented by the schemes such as beamforming, MIMO, and array antenna. The application of a cloud RAN as the big data processing technology may be an example of convergence of the 5G technology and the IoT technology.

Vehicle-to-Everything (V2X) is another example corresponding to a general term that refers to all types of communication schemes applicable to a means of transportation located on a road, for example, a vehicle and means a specific communication technology for implementing "Connected Vehicle" or "Networked Vehicle". The V2X networking is divided into three types, that is, Vehicle-to-Infrastructure (V2I) communication, Vehicle-to-Vehicle (V2V) communication, and Vehicle-to-Pedestrian (V2P) communication.

The development of V2I and V2V technology has been conducted with major objectives to improve road safety and, through the incorporation with the development of wireless communication technology, various additional IT services as well as initial safety-related use cases have been considered in recent years. The main advanced countries of telematics/ITS technology such as the EU, North America, Japan, and Korea have verified effectiveness and applicability of the technology through large-scale projects over the years.

According to such a trend, a 3rd Generation Partnership Project (3GPP) group has conducted standardization work to provide V2X communication based on LTE-Advanced. A Service Aspects (SA) group has defined requirements to be achieved in V2X communication as shown in Table 1 below and has agreed with the use of Device-to-Device (D2D) discovery and a communication function applied to the system after LTE Rel-12 for V2V and V2P communication.

TABLE 1

| requirements in V2X communication based on 3GPP LTE-Advanced | |
|---|---|
| Parameter | Value |
| Latency (End-to-End) | Typically Max. 100 ms Max. 20 ms for PCSW |
| Reliability | 80~95% |
| Range | 50~320 meter |
| Absolute Velocity | Max. 160 Km/h |
| Relative Velocity | Max. 280 Km/h |
| Message size | Typically 50-300 Bytes Up to 1200 Bytes |
| Message Frequency | 10 Messages per second |

Further, in V2I communication, communication with a Road-Side-Unit (RSU), which is communication equipment installed on the side of the road by an enhanced Node B (eNB) or a network service provider, is considered. At this time, the RSU may be recognized as one of the eNB and User Equipment (UE) to neighboring vehicles. Accordingly, in the specification, an RSU type in a case where the RSU is recognized as the eNB is defined as an "eNB-Type RSU", and an RSU type in a case where the RSU is recognized as the UE is defined as a "UE-Type RSU" for the convenience of the description. In V2I communication between the vehicle and the UE-Type RSU, the conventional Device to Device (D2D) discovery and communication function may be used like in V2V and V2P communication. Further, in communication between the eNB or the eNB-Type RSU and the vehicle, the conventional cellular uplink/downlink transmission/reception-based communication technology may be used.

In the above described LTE-based V2X communication, the conventional communication scheme may be re-used, but it is expected that, in order to meet the requirements to achieve V2X communication, some improvements must be made in the conventional communication scheme. Accordingly, a 3GPP Radio Access Network (RAN) group has examined various element technologies for supporting the V2X communication and standard changes in the conventional communication scheme through preceding research in the LTE-Release-13 standardization process. Particularly, the 3GPP RAN group has improved the conventional D2D discovery/communication channel structure and resource allocation method to reduce a response delay (latency) and increase reliability in D2D-based V2X communication and has discussed a method of improving a DeModulation-Reference Signal (DM-RS) allocation structure to increase channel estimation performance in a high speed movement environment.

SUMMARY

To address the above-discussed deficiencies, it is a primary object to provide a method of allocating resources for D2D-based V2X communication.

In accordance with an aspect of the present disclosure, a method of allocating resources for D2D communication by a User Equipment (UE) includes: identifying a movement direction of the UE; selecting a resource pool mapped to the identified movement direction among resource pools allocated according to the movement direction; and performing D2D communication using the selected resource pool.

In accordance with another aspect of the present disclosure, a method of allocating resources for D2D communication includes: acquiring a movement direction according to a User Equipment (UE); allocating UEs having an equal movement direction to an equal resource pool by using the acquired movement direction according to the UE; and transmitting information related to the resource pool to the UEs.

In accordance with another aspect of the present disclosure, a User Equipment (UE) for allocating resources for D2D communication includes: a controller configured to identify a movement direction of the UE and select resource pool mapped according to the identified movement direction among resource pools allocated according to the movement direction; and a transceiver configured to perform D2D communication using the selected resource pool according to an instruction of the controller.

In accordance with another aspect of the present disclosure, an evolved node B (eNB) for allocating resources for D2D communication includes: a controller configured to acquire a movement direction according to a User Equipment (UE) and to allocate UEs having an equal movement direction to an equal resource pool by using the acquired movement direction according to the UE; and a transceiver configured to transmit information related to the resource pool to the UEs according to an instruction of the controller.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
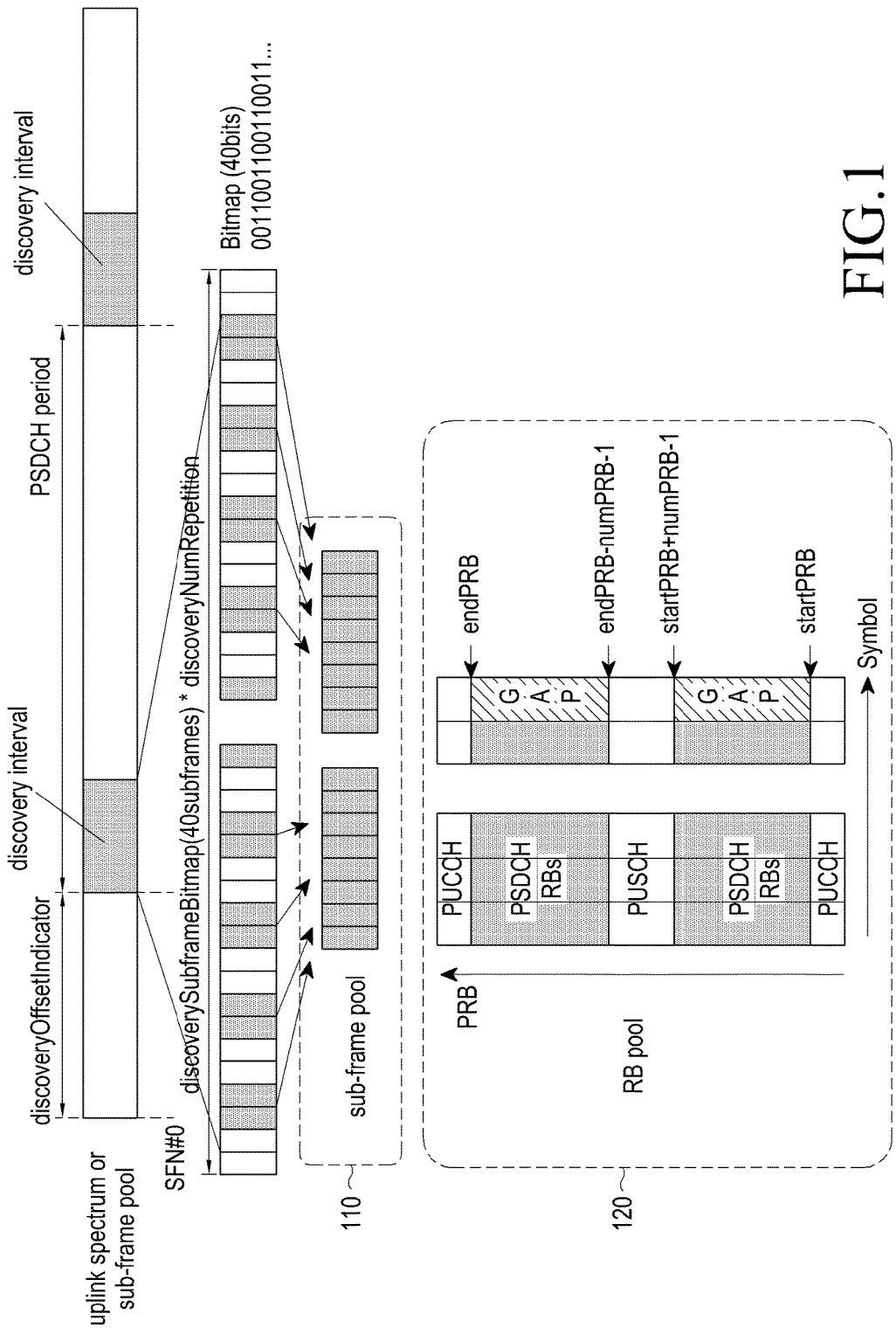
FIG. 1 illustrates a structure of a PSDCH defined in a 3GPP LTE Rel-12 system.

FIGS. 1 through 10B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms as described below are defined in consideration of the functions in the embodiments, and the meaning of the terms may vary according to the intention of a user or operator, convention, or the like. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

Hereinafter, embodiments of the present disclosure propose a method of allocating resources for D2D-based V2X communication.

A means of transportation that performs V2X communication according to embodiments of the present disclosure may be equipped with an electronic device that performs a communication function and can perform V2X communication through the equipped electronic device or an electronic device of a user who enters or rides in the means of transportation. In the specification and for the convenience of the description, an electronic device, a terminal, and a UE are interchangeably used as the same meaning. Further, communication between the means of transportation and the electronic device may be interchangeably used with communication between UEs or communication between means of transportation as the same meaning. For example, the electronic device may be a navigation device, a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, or a wearable device (for example, head-mounted device (HMD), electronic clothes, an electronic bracelet, an electronic necklace, an electronic appcessory, an electronic tattoo, or a smart watch).

The V2X communication according to an embodiment of the present disclosure can include traffic safety, volume of traffic, information transmission/reception for automatic vehicle control, and data communication between vehicles. Communication for traffic safety can transmit/receive information, for example, such as informing of the existence of an accident ahead, warning of a collision risk at an adjacent location, ordering an emergency stop before a collision, and warning about the existence of a pedestrian. Communication for the volume of traffic can be used for, for example, informing of congested areas or for navigation. The automatic vehicle control can be used for, for example, executing an automatic parking function or an automatic driving function.

To this end, a structure of a Physical Sidelink Discovery Channel) for UE discovery and a resource selection method in D2D communication will be first described. Like the PSDCH, the same channel structure can be used in a Physical Sidelink Shared Channel (PSSCH) corresponding to a channel for D2D communication. Hereinafter, the present specification describes the PSDCH structure as an example for the convenience of the description.

FIG. 1 illustrates a structure of a PSDCH defined in a 3GPP LTE Rel-12 system.

Referring to FIG. 1, a PDSCH consists of a plurality of sub-frames. Further, the plurality of sub-frames are divided into a discovery offset indicator reception interval indicating a start frame number of a UE discovery interval and predetermined PSDCH periods for D2D communication on a time axis. In the predetermined discovery interval within a PSDCH period, the corresponding UE discovers a signal of another UE for D2D communication.

In the discovery interval, as defined in Table 2 below, the product of a discovery sub-frame bitmap (SubframeBitmap) and a discovery NumRepetition can be indicated in the form of a bitmap of 40 bits and a sub-frame pool may consist of sub-frames for discovery as indicated by reference numeral 110. Meanwhile, as indicated by reference numeral 120, the PDSCH can be multiplexed in the form of Frequency Division Multiplexing (FDM) with a Physical Uplink Control Channel (PUCCH) and Physical Uplink Shared Channel (PUSCH) on a frequency axis.

Within one discovery interval, a total of four PSDCH resource pools can be allocated. Further, all of a location of sub-frame for each of the allocated resource pools, and locations and the number of Resource Blocks (RBs) on the frequency axis are transferred to UEs through System Information Block (SIB) transmission of the eNB. Table 2 below shows an example of location-related information of the PSDCH resource pool included within the SIB of the eNB.

TABLE 2 example location-related information of
PSDCH resource pool provided through SIB

| Parameter | Descriptions |
| --- | --- |
| Period | Discovery channel period |
| SubframeBitmap | Location of sub-frame used as discovery channel |
| NumPRB | Number of PRBs per sub-frame |
| StartPRB | Start location of discovery PRB on frequency axis |
| EndPRB | End location of discovery PRB on frequency axis |
| OffsetIndicator | Start frame number of SFN#0 reference discovery period |
| NumRepetition | Number of re-transmissions of discovery message |

Figure 2:
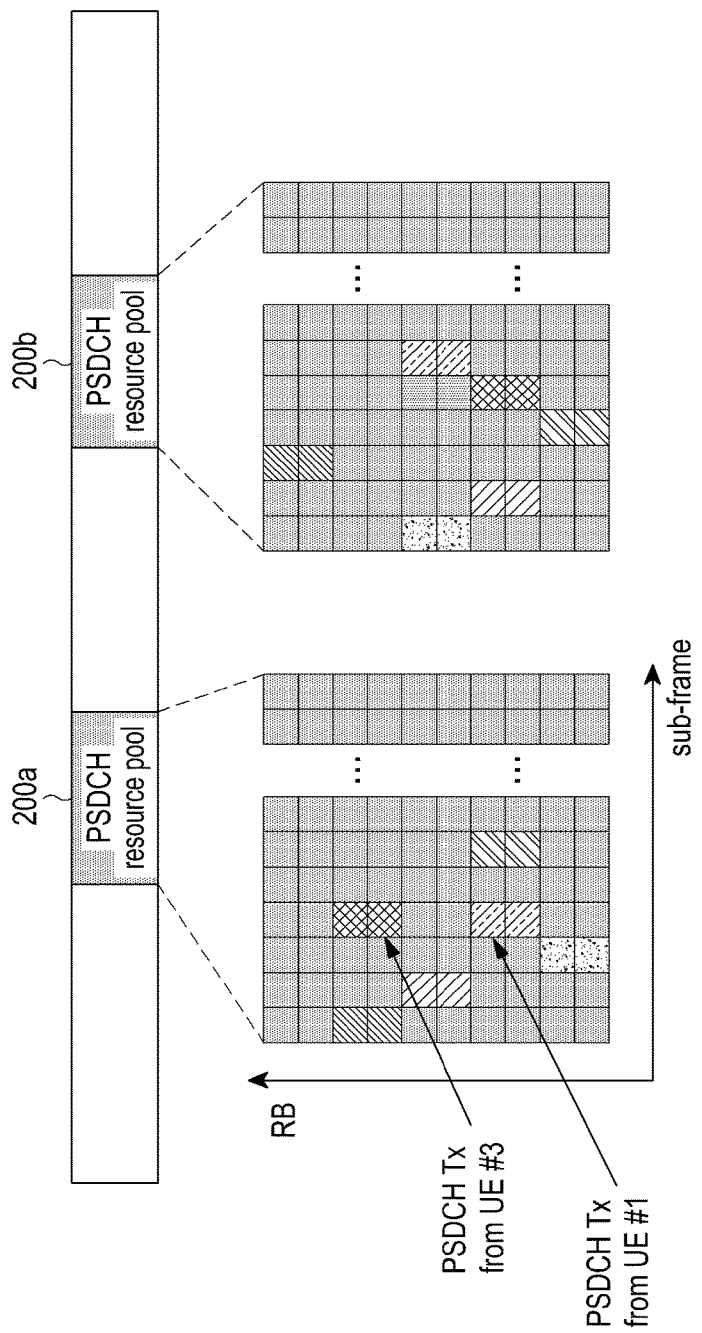
FIG. 2 illustrates an example of a PSDCH resource pool allocated to each discovery interval in the PSDCH of FIG. 1.

Each UE having received the SIB from the eNB can select one of PSDCH resource pools acquired from the SIB to transmit a discovery signal. FIG. 2 illustrates an example of the PSDCH resource pool allocated to each discovery interval in the PSDCH of FIG. 1. In this case, the corresponding UE can randomly select the corresponding resource pool or can select the resource pool having a relatively bad channel state. An average Reference Signal Received Power (RSRP) of each resource pool is compared and a resource pool having a minimum value may be selected as the pool having the relatively bad channel state. Alternatively, the eNB can directly select the resource pool to be used by a particular UE from the resource pools and transfer information on the selected resource pool to the corresponding UE. Referring to FIG. 2, for example, UE#1 and UE#3 select two different RBs in the same sub-frame as resources to be used for transmitting discovery signals in a PDSCH resource pool corresponding to a discovery interval 200a.

When the channel structure and the resource selection method for D2D communication as described in FIG. 1 are applied to a V2X communication environment, Inter-Carrier Interference (ICI) between adjacent V2X signals on the frequency axis may occur due to frequency offsets because of characteristics of means of transportation having a relatively high movement speed compared to a mobile UE.

Based on the current 3GPP standard, an aim is to support a relative movement speed of a maximum of 280 km/h in V2X communication using the communication frequency band of 5.9 GHz and the D2D channel described above. A maximum Doppler spread $d_{dmax}$ which can be generated under such a condition can be expressed as equation (1) below.

$$f_{dmax} = \frac{f_c v}{c} = \frac{5.9 \times 10^9 \text{ Hz} \times 280 \times 10^8 \text{ m}/3600 \text{ s}}{3 \times 10^8 \text{ m/s}} \simeq 1529.63 \text{ Hz} \quad (1)$$

In equation (1), $f_c$ denotes a carrier frequency, v denotes a movement speed, and c denotes the speed of light.

A value of maximum Doppler spread calculated by equation (1) above corresponds to about 10.2% of 15 KHz which is a subcarrier interval of 3GPP LTE system. That is, a size of a maximum frequency offset which can be generated in the V2X communication environment corresponds to 10.2% of the subcarrier interval. Meanwhile, a sign of the frequency offset due to Doppler spread varies depending on a difference in the relative movement direction between the transmission side and the reception side. When it is assumed that the transmission side and the reception side move to narrow a distance therebetween, the frequency offset of a "positive direction" is generated in a received signal. In contrast, when the transmission side and the reception side move to widen the distance therebetween, the frequency offset of a "negative direction" is generated in the received signal.

Figure 3:
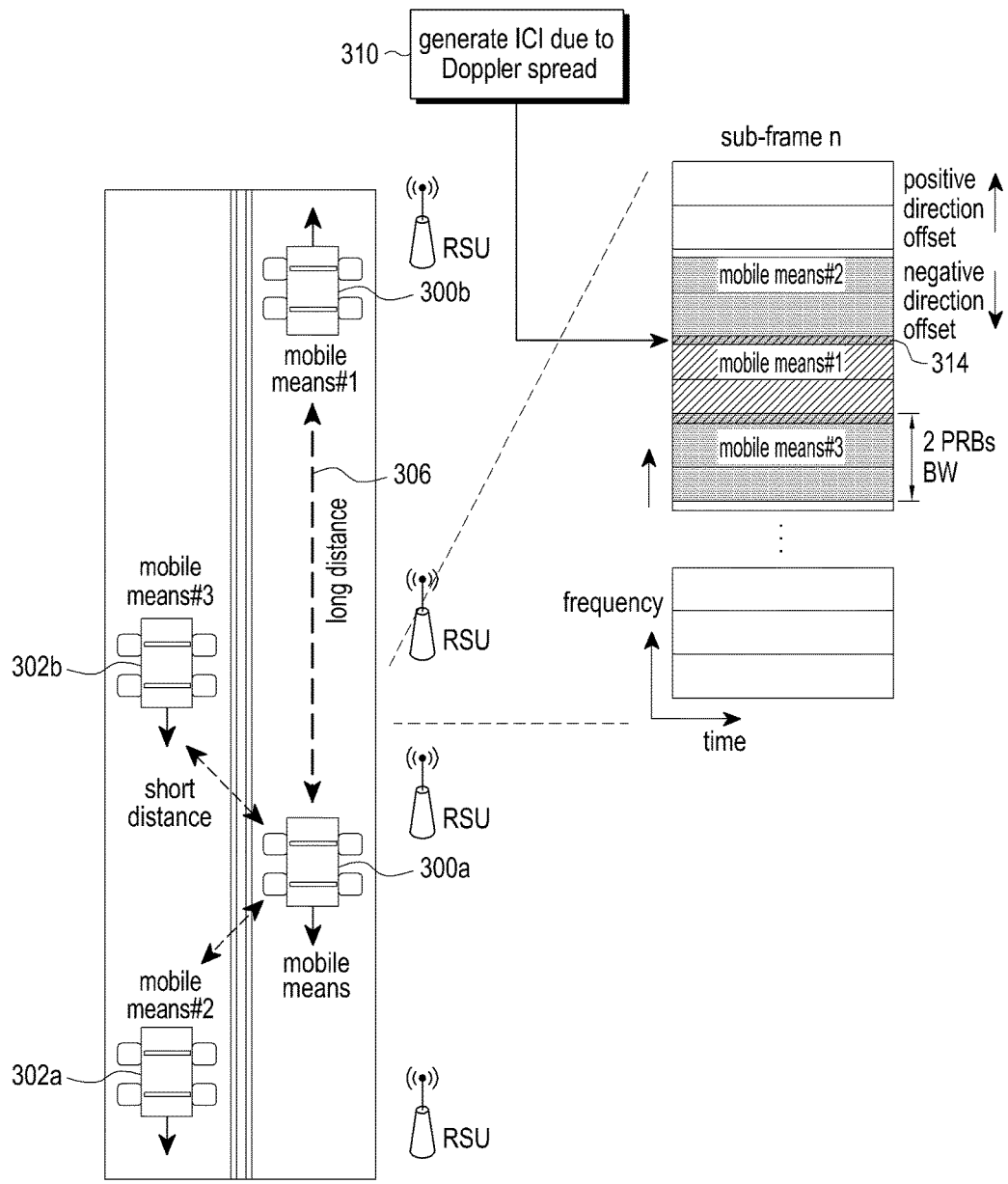
FIG. 3 illustrates an example of a situation where ICI is generated in general V2X communication.
Figure 4:
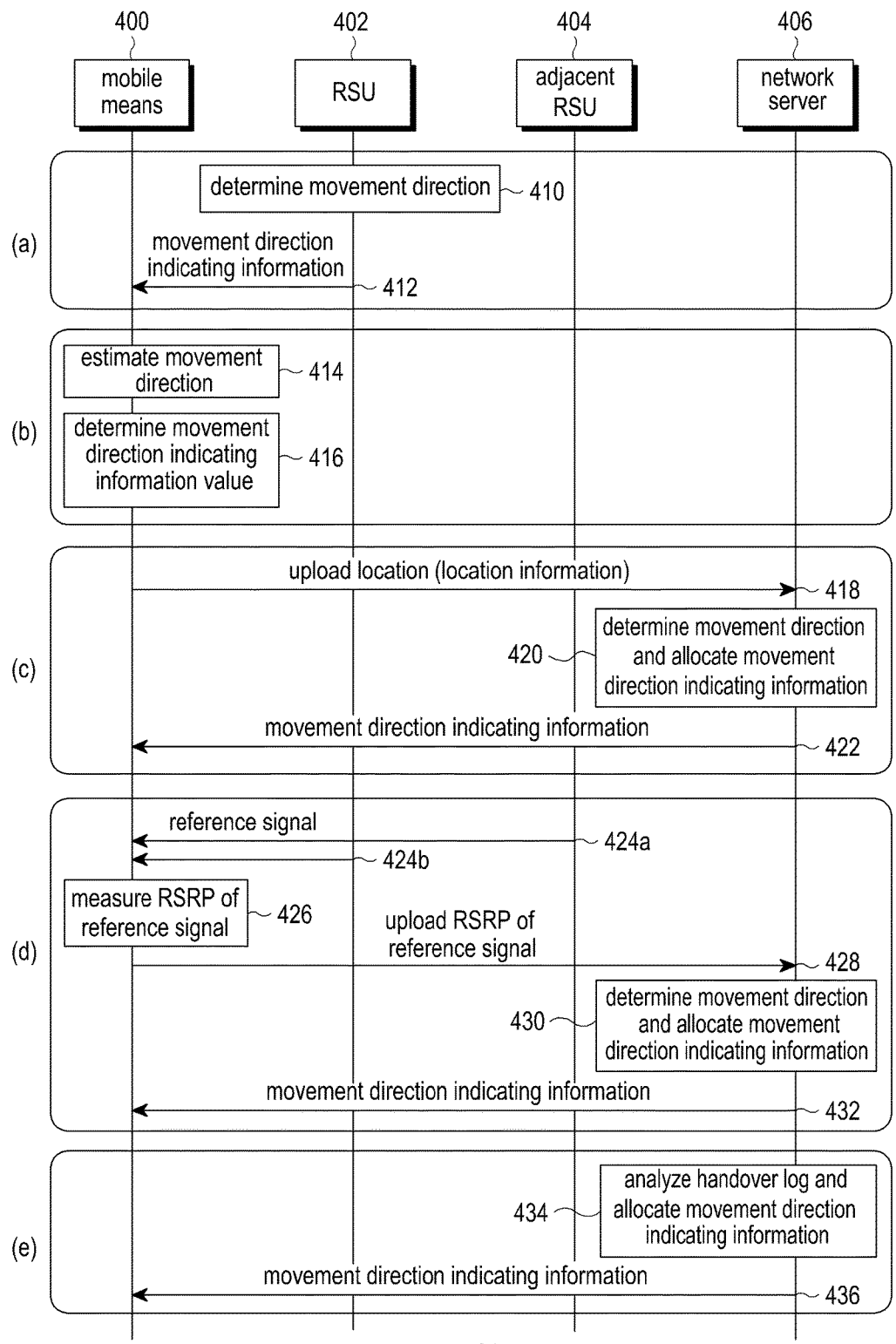
FIG. 4 illustrates embodiments of configuring movement direction indicating information of a means of transportation according to an embodiment of the present disclosure.

FIG. 3 illustrates an example of a situation where ICI occurs in general V2X communication.

Referring to FIG. 3, for example, it is assumed that a means of transportation 300a operates as a reception side for V2X communication. Then, the means of transportation 300a can receive D2D signals received by means of transportation, for example, means of transportation #1 300b moving in the same direction as that of the means of transportation 300a and means of transportation, for example, means of transportation #2 302a and means of transportation 3 302b moving in a different direction from that of the means of transportation 300a. At this time, means of transportation #1 300b moving in the same direction as that of the means of transportation 300a has no difference in a relative movement speed from the means of transportation 300a, so that signals transmitted/received by the means of transportation 300a and means of transportation #1 300b have no frequency offset.

In contrast, means of transportation #2 302a and means of transportation #3 302b moving in the different direction from that of the means of transportation 300a have a difference in a relative movement speed from the means of transportation 300a, so that an offset corresponding to a maximum of 10.2% of the subcarrier interval can be generated. As illustrated in FIG. 3, it is assumed that means of transportation #1 300b to means of transportation #3 302b use radio resource adjacent on the frequency axis. In this case, a transmission signal of each vehicle causes ICI 310 to a transmission signal of a counterpart vehicle, thereby deteriorating reception performance of the means of transportation 300a. Here, as the means of transportation 300a and means of transportation #2 302a are moving in directions, which widen a distance therebetween, that is, in opposite directions, respective transmission signals can generate frequency offsets in a negative direction to each other.

Therefore, the following embodiments of the present disclosure propose a method of minimizing ICI which can be generated due to a difference in the movement direction by movements of the means of transportation in the V2X communication environment.

According to a detailed example of a scheme for minimizing ICI, a guard RB or a guide subcarrier can be allocated between resources allocated to V2X communication based on characteristics that an influence of ICI becomes larger as frequencies allocated to a received signal and an interference signal are closer to each other and the influence of ICI becomes smaller as a distance between the two signals on a frequency axis is longer. For example, by allocating n top RBs and n bottom RBs based on an RB to which a particular V2X signal is allocated on the frequency axis as the guard RBs, it is possible to prevent the guard RBs from being allocated to signal transmission of other means of transportation. Alternatively, some subcarriers located at both ends of a frequency interval corresponding to the RB to which the V2X signal is allocated can be allocated as the guard subcarriers. At this time, the number of guard RBs or guard subcarriers can be determined in advance or can be configured by the eNB or the network. However, allocating the guard RB or the guard subcarrier causes a waste of radio resources, thereby decreasing a total transmission rate of the network or a transmission rate of a single link.

Therefore, embodiments of the present disclosure propose a resource scheduling method considering a movement direction of a means of transportation in order to improve ICI between V2X signals without a waste of resources. Specifically, according to an embodiment of the present disclosure, the resource scheduling method is largely divided into a method of configuring movement direction indicating information of the means of transportation and a radio resource allocation method for V2X communication based on movement direction indicating information.

1) Method of Configuring Movement Direction Indicating Information

First, a method of configuring movement direction indicating information according to an embodiment of the present disclosure will be described. According to an embodiment of the present disclosure, MoveDirection Flag, which is control information used for dividing the movement direction of each means of transportation, is defined and MoveDirection Flag corresponding to the movement direction of each means of transportation is allocated. Further, MoveDirection Flag can be pre-configured according to the embodiment of FIG. 4 or can be configured by the network. For the convenience of the description, FIG. 4 includes FIGS. 4(a) to 4(e) showing examples of embodiments of configuring MoveDirection Flag.

Hereinafter, corresponding operations will be described according to a subject of the operation, which configures in advance movement direction indicating information according to an embodiment of the present disclosure with reference to FIGS. 4(a) and 4(b).

FIG. 4(a) is an example of a flowchart illustrating an operation for allocating a predetermined value of MoveDirection Flag according to a movement direction of a means of transportation by an RSU.

Referring to FIG. 4(a), for example, when an RSU 402 disposed on a ramp of the road detects a means of transportation 400 that enters its own service coverage, that is, a road, MoveDirection Flag can be allocated to the means of transportation 400. It is assumed that the RSU 402 is installed in a tollgate at which entry directions into an expressway are divided into an up direction and a down direction. Then, in step 410, the RSU 402 determines a movement direction of the means of transportation 400 having entered the tollgate. When the means of transportation 400 enters an up direction lane, the RSU 402 allocates "0" to MoveDirection Flag of the means of transportation 400. Further, when the means of transportation 400 enters a down direction lane, the RSU 402 allocates "1" to MoveDirection Flag of the means of transportation 400. The value of MoveDirection Flag allocated by the RSU can be a predetermined value for each of the up direction lane and the down direction land and an opposite value thereof can be allocated. In step 412, the RSU 402 transfer MoveDirection Flag set as the allocated value to the means of transportation 400.

FIG. 4(b) is an example of a flowchart illustrating an operation for allocating its own predetermined value of MoveDirection Flag according to its own movement direction by a means of transportation.

Referring to FIG. 4(b), in step 414, the means of transportation 400 observes a coordinate change for a predetermined time by using a GPS reception device and estimate its own movement direction. At this time, the GPS reception device can be a device installed within the means of transportation 400 or a separate navigation device or electronic device for communication. In step 416, the means of transportation 400 identifies a value of MoveDirection Flag corresponding to the estimated own movement direction. In this case, the value of MoveDirection Flag allocated according to the movement direction is defined in advance. For example, when it is assumed that MoveDirection Flag of 2 bits is used for four bearings of north, south, east, and west, east can be defined as "00", west can be defined "01", south can be defined "10", and north can be defined as "11". Accordingly, in step 416, the means of transportation 400 can determine a value corresponding to its own movement direction estimated in step 414 among the predefined values of MoveDirection Flag.

An operation for configuring movement direction indicating information of a means of transportation by a network will be described according to an embodiment of the present disclosure with reference to FIGS. 4(c) to 4(e). The network can grasp a movement direction of each means of transportation and allocate a value of MoveDirection Flag corresponding to the corresponding movement direction on a space coordinate. Like the example described in FIG. 4B, MoveDirection Flag of 2 or more bits can be used for each of the four bearings as necessary. There are various embodiments according to a method by which the network grasp a movement direction of each vehicle.

FIG. 4(c) is an example of a flowchart illustrating an operation for configuring movement direction indicating information by a network based on location information periodically transmitted by each means of transportation according to an embodiment of the present disclosure.

Referring to FIG. 4(c), in step 418, the means of transportation 400 uploads its own location information, for example, a location coordinate to a network server 406 of a mobile communication network according to a predetermined period. Then, in step 420, the network server 406 collects uploaded location information according to each means of transportation, analyzes a coordinate change of the corresponding means of transportation based on the location information of each means of transportation, and allocates a value of MoveDirection Flag corresponding to an acquired location coordinate according to the analyzed coordinate change among values of MoveDirection Flag mapped according to each location coordinate. Further, in step 422, the network server 406 transmits the allocated value of MoveDirection Flag to each means of transportation, for example, the means of transportation 400.

FIG. 4(d) is an example of a flowchart illustrating an operation for configuring movement direction indicating information by a network based on RSRP of signals received from a plurality of RSUs installed on the side of the road, which is measured by a means of transportation moving on the road according to an embodiment of the present disclosure.

Referring to FIG. 4(d), for example, it is assumed that the means of transportation 400 receives a reference signal transmitted from each of the RSU 402 and the adjacent RSU 404 installed on the side of the road while moving along the road in steps 424a and 424b. The means of transportation 404 measures RSRP of the reference signal in step 426, and uploads the measured RSRP to the network server 406 in step 428.

The network server 406 can determine a movement direction of the corresponding means of transportation by using the measured RSRP of the reference signal received according to each means of transportation in step 430. In general, when the means of transportation comes close to a particular RSU, the network server 406 determines a movement direction of the means of transportation 400 based on changes in the measured RSRP of the corresponding means of transportation, that is, the means of transportation 400 and a location of each RSU on the basis of characteristics of increasing RSRP for the reference signal of the particular RSU. Further, as described above, among the predetermined values of MoveDirection Flag according to each movement direction, the determined value of MoveDirection Flag is allocated to the determined movement direction of the means of transportation 400. In addition, in step 432, the network server 406 transmits the allocated value of MoveDirection Flag to the means of transportation 400.

FIG. 4(e) is an example of a flowchart illustrating an operation for configuring movement direction indicating information of a corresponding UE by a network based on a handover history of each means of transportation according to an embodiment of the present disclosure.

Referring to FIG. 4(e), in step 434, the network server 406 determines a movement direction of the corresponding means of transportation by analyzing a handover log of each means of transportation. For example, the means of transportation 400 determines a movement direction of the means of transportation 400 based on locations and access orders of eNBs that the means of transportation 400 has accessed during movement. Then, the network server 406 allocates a value of MoveDirection Flag corresponding to the determined movement direction among the predetermined values of MoveDirection Flag. Further, in step 436, the network server 406 transmits the allocated value of MoveDirection Flag to the means of transportation 400.

Figure 5:
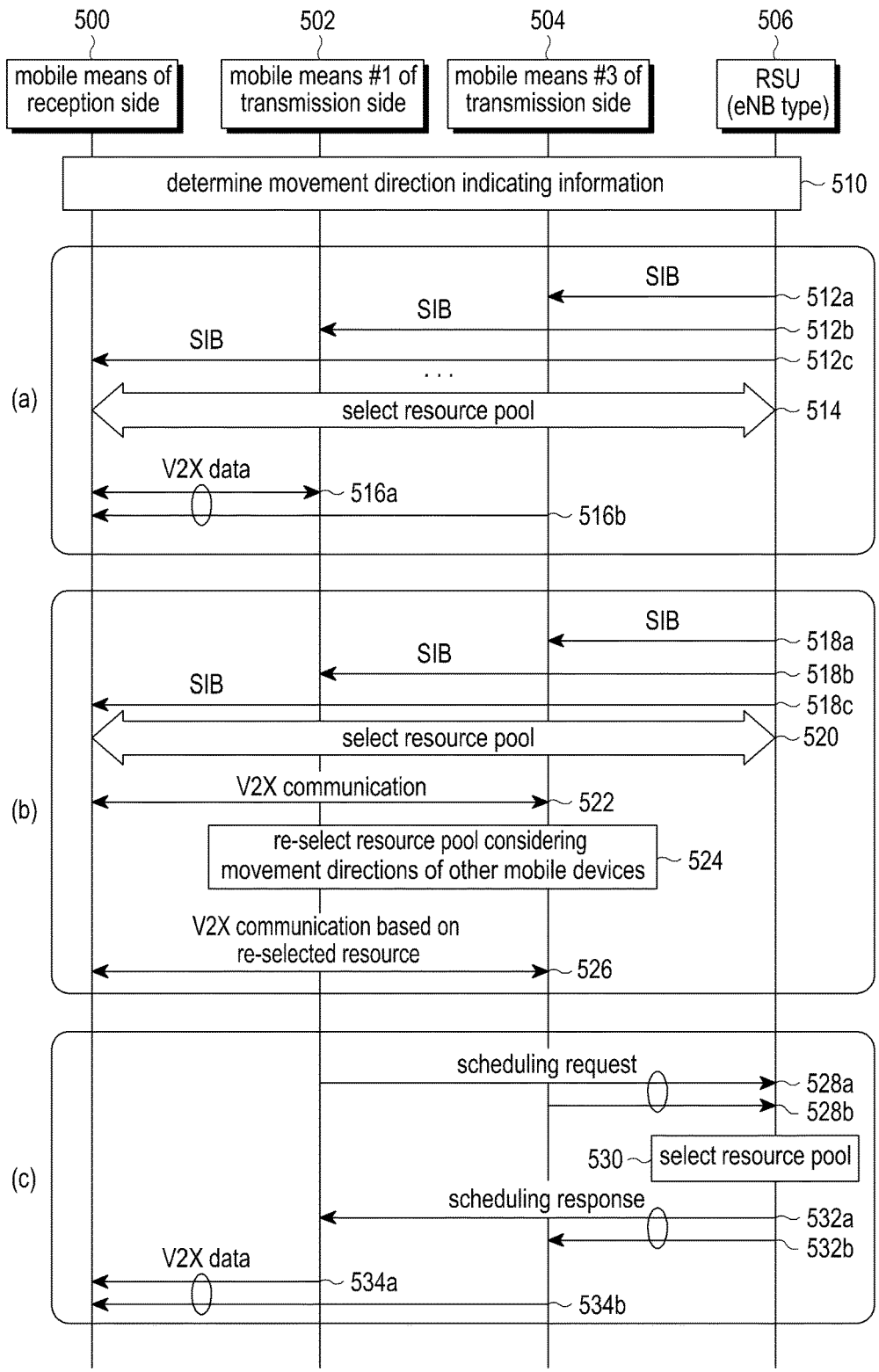
FIG. 5 illustrates embodiments of allocating resources for V2X communication based on a movement direction of a means of transportation according to an embodiment of the present disclosure.

2) V2X Resource Allocation Method Based on Movement Direction of Means of Transportation Next, a method of allocating resources for V2X communication based on the movement direction indicating information of each means of transportation configured as described above will be described. The resource allocation method according to an embodiment of the present disclosure can include three schemes such as a scheme for allocating resources in different resource pools allocated according to a movement direction of the means of transportation, a scheme for selecting a resource pool based on a movement direction of an adjacent means of transportation estimated by each means of transportation, and a scheme for performing scheduling by an eNB in consideration of a movement direction of each means of transportation as illustrated in FIG. 5. For the convenience of the description, FIG. 5 includes FIGS. 5(a), 5(b) and 5(c) illustrating examples of embodiments of the three resource allocation schemes.

Hereinafter, the resource allocation method using the movement direction of each means of transportation will be described according to an embodiment of the present disclosure with reference to FIGS. 5(a), 5(b) to 5(c). It is assumed that movement direction indicating information of the corresponding means of transportation is first determined in step 510 in the embodiments of FIGS. 5(a) to 5(c). At this time, since the determination of the movement direction indicating information in step 510 can be performed according to one of the methods described in FIGS. 4(a) to 4(e), an overlapping description is omitted.

FIG. 5(a) is an example of a flowchart illustrating an operation of the scheme for allocating resources for V2X communication by applying different resource pools based on the movement direction according to an embodiment of the present disclosure.

Figure 6:
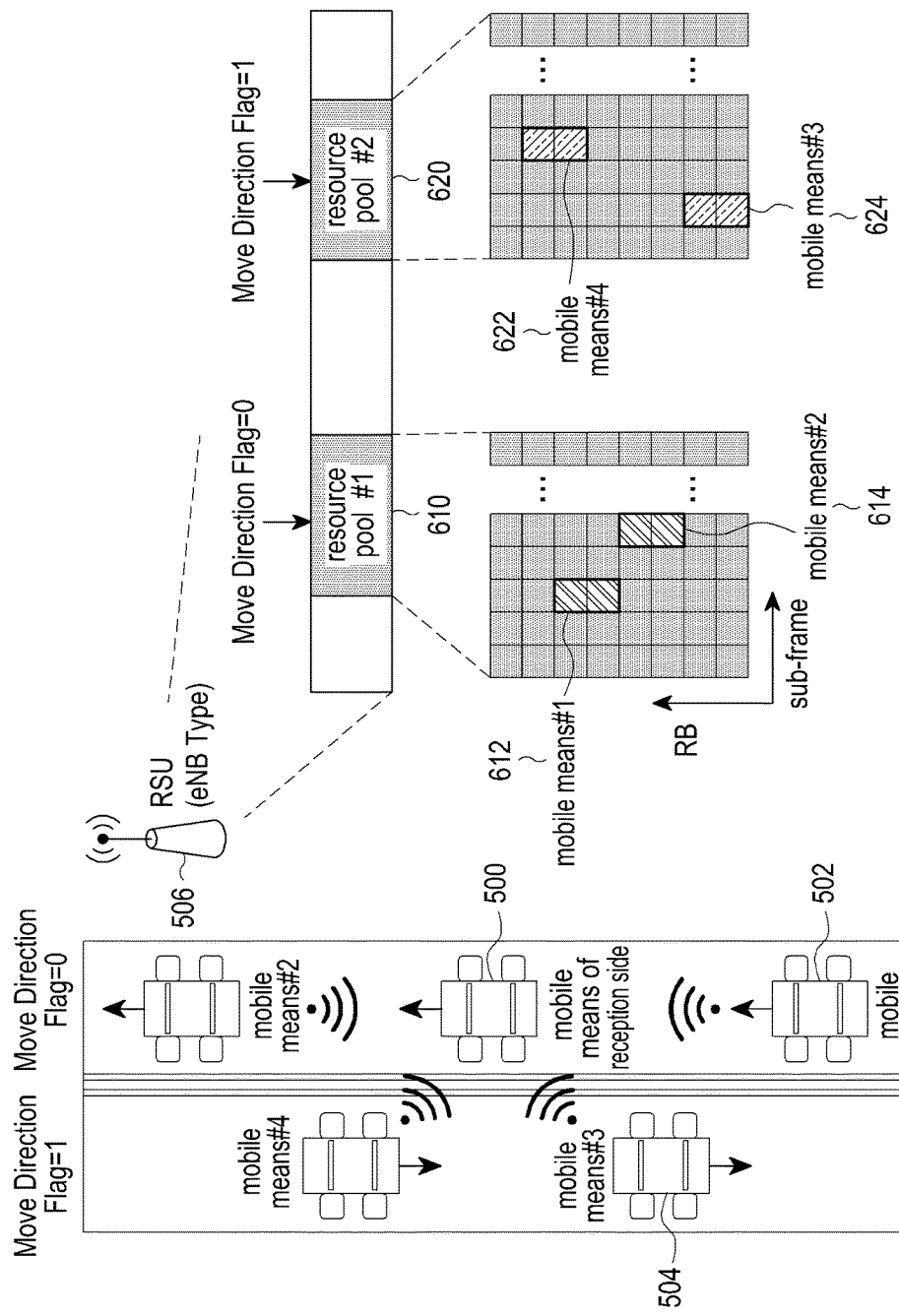
FIG. 6 illustrates an example of a situation where an eNB-type RSU determines movement direction indicating information of a means of transportation according to an embodiment of the present disclosure.

In the embodiment FIG. 5(a), it is assumed that the movement direction indicating information in step 510 is determined based on, for example, an environment illustrated in FIG. 6. FIG. 6 illustrates an example of a situation where the eNB-type RSU determines movement direction indicating information of a means of transportation according to an embodiment of the present disclosure. Referring to FIG. 6, it is assumed that an eNB-type RSU 506 is installed on the side of the road configured in two directions such as an up direction and a down direction. Further, it is assumed that a value of MoveDirection Flag of the movement direction corresponding to the up direction of the road is set as "0" and a value of MoveDirection Flag of the movement direction corresponding to the down direction of the road is set as "1". The RSU 506 allocates resources of means of transportation having a value of MoveDirection Flag of "0" in resource pool #1 610 among resource pools allocated for a D2D discovery and communication according to an embodiment of the present disclosure. The RSU 506 allocates resources of means of transportation having a value of MoveDirection Flag of "1" in resource pool #2 620 among resource pools allocated for a D2D discovery and communication according to an embodiment of the present disclosure. In this case, the RSU 506 allocates resources for V2X communication with respect to each of a means of transportation 500 of a reception side, means of transportation #1 502, and means of transportation #2, which have a movement direction corresponding to the up direction of the road, in resource pool #1 610. For example, the RSU 506 can allocate two RBs 612 and 614 per sub-frame included in resource pool #1 610 as resources for V2X communication of means of transportation #1 502 and means of transportation #2, respectively. Similarly, the RSU 506 can allocate two RBs 622 and 624 per sub-frame included in resource pool #2 620 as resources for V2X communication of means of transportation #3 504 and means of transportation #4 having a movement direction corresponding to the down direction of the road, respectively.

As illustrated in FIG. 6, resource allocation division according to the movement direction is possible through the performance of D2D discovery/communication using different resource pools according to the movement direction. In this case, the eNB or the eNB-type RSU, for example, the RSU 506 defining the resource pool as described above transmits the SIB with information on the resource pool mapped according to each value of MoveDirection Flag in steps 512a to 512c. The information on the resource pool mapped according to each value of MoveDirection Flag can indicate resource pool #1 610 mapped to the value "1" of MoveDirection Flag and resource pool #2 620 mapped to the value "0" of MoveDirection Flag.

In step 514, each of the means of transportation 500 of the reception side, means of transportation #1 502, and means of transportation #2 504 having received the SIB through steps 512a to 512c selects the resource pool mapped to the value of MoveDirection Flag determined in step 510. Here, it is assumed that means of transportation #1 502 and means of transportation #3 504 are determined as a transmission side of D2D communication with respect to the means of transportation 500 of the reception side. Thereafter, in step 516a, means of transportation #1 502 transmits V2X data to the means of transportation 500 of the reception side by using RBs 512 allocated in resource pool #1 610. Similarly, in step 516b, means of transportation #3 504 transmits V2X data to the means of transportation 500 of the reception side by using RBs 624 allocated in resource pool #2 620.

Meanwhile, according to another embodiment, a mapped movement direction can be predefined according to an arrangement order of each resource pool. In this case, even though a separate value of MoveDirection Flag is not determined according to each resource pool, each mobile mean can identify a movement direction mapped to the corresponding resource pool based on an order of the corresponding resource pool within one period and can select a resource pool corresponding to a value of its own MoveDirection Flag.

Meanwhile, the method of configuring the resource pool according to each movement direction according to an embodiment of the present disclosure can be variously modified as illustrated in FIGS. 7A through 7D.

Figure 7A:
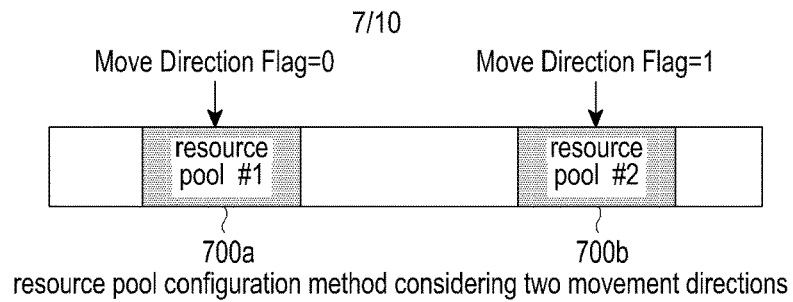
FIGS. 7A, 7B, 7C and 7D illustrate examples of a method of configuring a resource pool according to a movement direction according to an embodiment of the present disclosure.
Figure 7B:
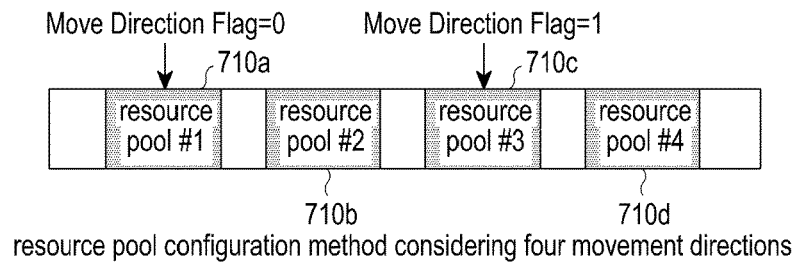

First, as illustrated in FIGS. 7A and 7B according to an embodiment, movement directions of the means of transportation can be further sub-divided and thus there can be two resource pools 700a and 700b and four resource pools 710a to 710d. Accordingly, means of transportation moving in different directions can select resources of each of the resource pools. According to an embodiment of the present disclosure, the number of resource pools and the number of movement directions are only examples, and can exceed four.

Figure 7C:
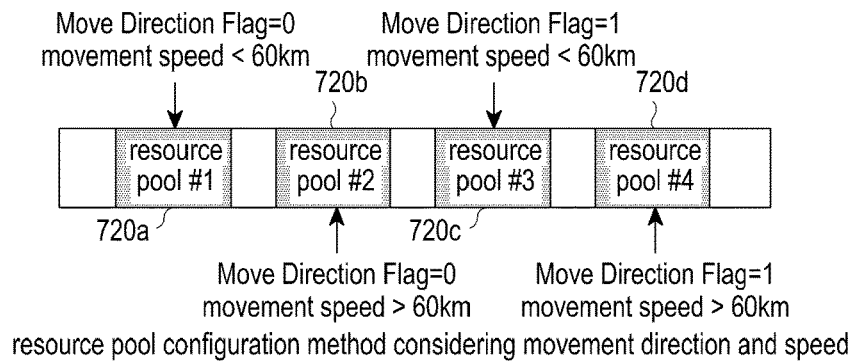

According to another embodiment, as illustrated in FIG. 7C, the eNB maps a movement direction and a movement speed according to each resource pool in consideration of both the corresponding movement direction and movement speed of the means of transportation, so that the corresponding means of transportation can select the resource pool in consideration of both its own movement direction and movement speed. In the embodiment shown in FIGS. 7A to 7D, different resource pools corresponding to a total of four combinations including cases where the movement speed of the means of transportation is faster than 60 km and is slower than 60 km with respect to two movement directions. Specifically, resource pool #1 720a is allocated to means of transportation, of which the value of MoveDirection Flag is "0" and the movement speed is slower than 60 km, and resource pool #2 720b is allocated to means of transportation, of which the value of MoveDirection Flag is "0" and the movement speed is faster than 60 km. Further, resource pool #3 720c is allocated to means of transportation, of which the value of MoveDirection Flag is "1" and the movement speed is slower than 60 km, and resource pool #4 720d is allocated to means of transportation, of which the value of MoveDirection Flag is "1" and the movement speed is faster than 60 km.

Figure 7D:
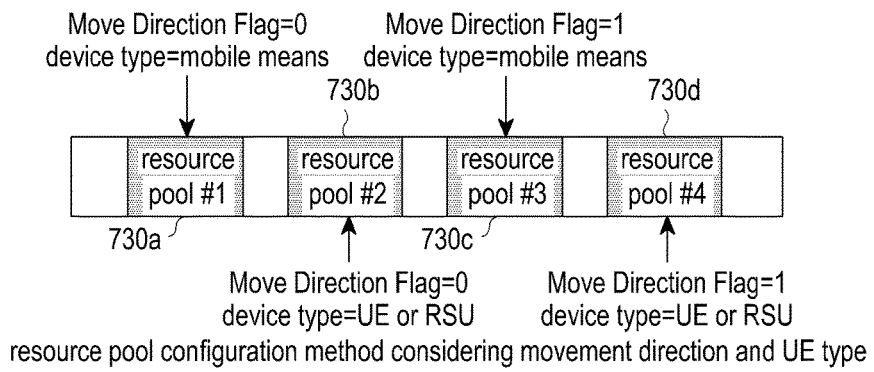

According to another embodiment, as illustrated in FIG. 7D, the eNB maps a movement direction, a movement speed, and a device type of the UE according to each resource pool in consideration of the device type of the UE as well as the movement direction and the movement speed, so that the corresponding means of transportation can select the resource pool corresponding to its own device type grasped by the means of transportation as well as its own movement direction and movement speed. Here, the device type of the UE can be divided into a means of transportation, a smart phone, or a UE-type RSU. At this time, the device type of the UE may be preset to the corresponding device according to the type of the device or indirectly grasped by the movement speed. For example, when the movement speed of the corresponding device is faster than a predetermined reference value of the movement speed, the corresponding device can be determined as the means of transportation. When the movement speed is slower than the reference value or is zero in a stopped state, the corresponding device can be determined as the smart phone or the UE-type RSU. Specifically, resource pool #1 730a is allocated to the device, of which the value of MoveDirection Flag is "0" and the device type is the means of transportation, and resource pool #2 730b is allocated to the device, of which the value of MoveDirection Flag is "0" and the device type is the UE or the RSU. Further, resource pool #3 730c is allocated to the device, of which the value of MoveDirection Flag is "1" and the device type is the means of transportation, resource pool #4 730d is allocated to the device, of which the value of MoveDirection Flag is "1" and the device type is the UE or the RSU.

The resource allocation method according to an embodiment of the present disclosure can employ modified embodiments in which divided resource pools are allocated in consideration of at least one of the movement direction, the speed, and the UE type or in consideration of both of two or more thereof as described above. Further, the number of devices communicating in the corresponding direction can be further considered.

FIG. 5(b) is an example of a flowchart illustrating an operation of the scheme for allocating resources for V2X communication in consideration of movement directions of adjacent means of transportation according to an embodiment of the present disclosure.

Referring to FIG. 5(b), in steps 518a to 518c, the RSU 506 transmits SIBs including resource pool information allocated for V2X communication. Unlike the embodiment of FIG. 5(a), mapping of different resource pools according to the movement direction does not occur in the embodiment of FIG. 5(b). Accordingly, each of the means of transportation having received the SIBs selects a resource pool in step 520. In this case, each of the means of transportation randomly selects the resource spool among the resource pools acquired through the SIBs or follows the conventional scheme for selecting the resource pool having a relatively bad channel state.

Figure 8:
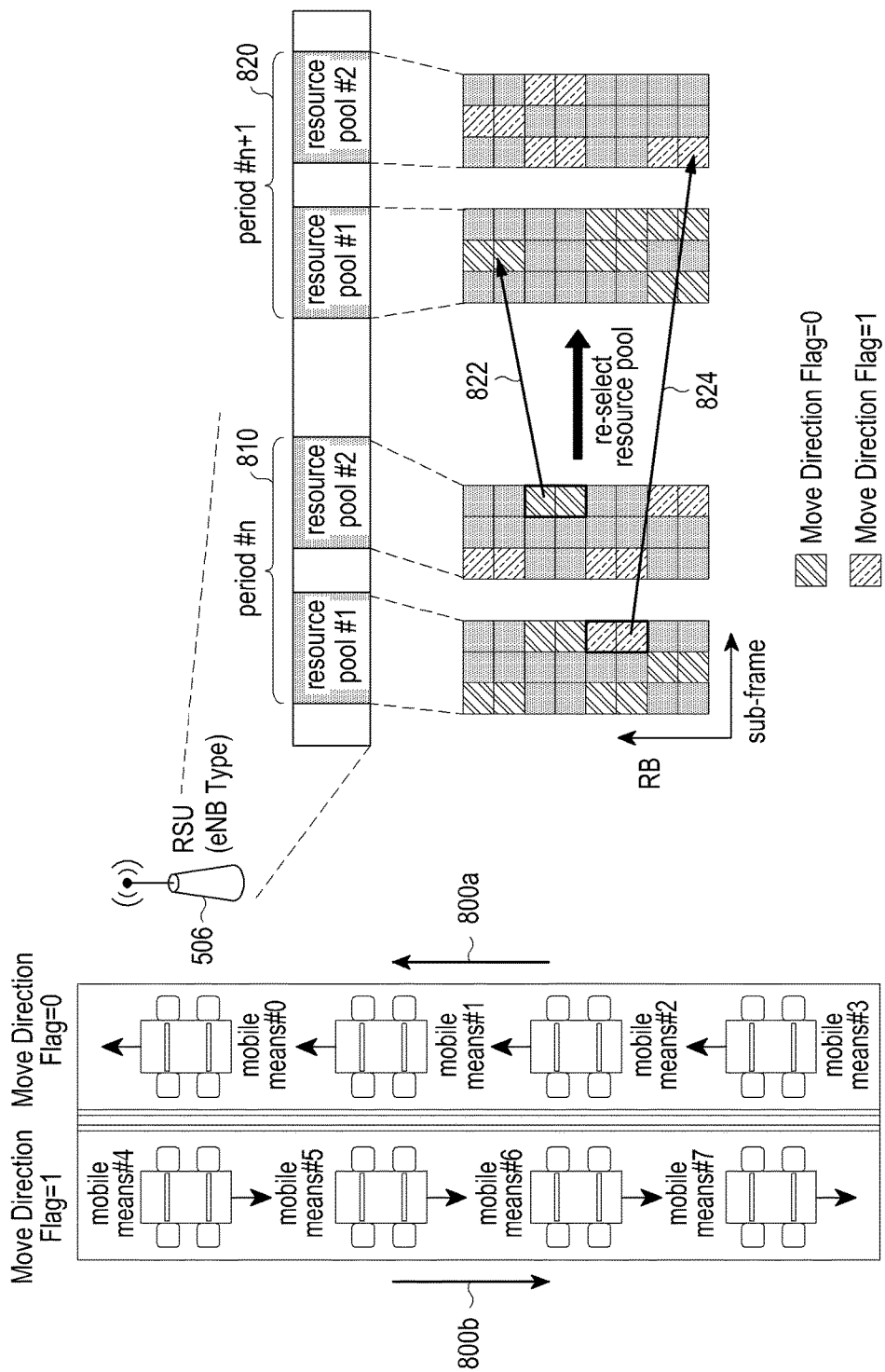
FIG. 8 illustrates an example of re-selecting the resource pool of FIG. 5B.

Thereafter, in step 522, each of the means of transportation 500 of the reception side, means of transportation #1 502, and means of transportation #2 502 perform V2X communication by using the resource pool selected in step 520. Here, the V2X communication includes both the D2D discovery and actual data communication. At this time, each of the means of transportation 500 of the reception side, means of transportation #1 502, and means of transportation #2 504 transmit a discovery signal for the D2D discovery or an actual data signal with its own MoveDirection Flag and used resource pool indicating information. Here, the value of MoveDirection Flag of the corresponding means of transportation is determined in step 510 described above. Accordingly, in step 522, each means of transportation having received the discovery signal or the actual data signal can identify the movement direction of each means of transportation by detecting values of MoveDirection Flag of other means of transportation from the discovery signals or actual data signals of other means of transportation transmitted in the corresponding resource pools. Then, in step 524, each of means of transportation #1 502 and means of transportation #2 504 re-selects the resource pool including many means of transportation having the same value of MoveDirection Flag as its own movement direction in the next transmission period. Thereafter, in step 524, each of means of transportation #1 502 and means of transportation #2 504 perform V2X communication in the next period by using the re-selected resource pool with the means of transportation 500 of the reception side. Similarly, the V2X communication can include both the D2D discovery and the actual data communication. FIG. 8 illustrates an example of re-selection of the resource pool of FIG. 5B.

Referring to FIG. 8, it is assumed that resource pool #1 and resource pool #2 can be selected for V2X communication during period #n 810 in the resource pool selection process of step 520 of FIG. 5(b). Further, it is assumed that means of transportation #2 504 selects RBs of resource pool #1. In this case, it is assumed that means of transportation #2 504 identifies that much resource pool indicating information mapped to the value "1" of MoveDirection Flag corresponding to its own movement direction is mapped to resource pool #2 from the discovery signals or the actual data signals of the other means of transportation through the V2X communication in step 522. Then, means of transportation #2 504 selects resource pool #2 as a resource pool to be used in next period #n+1 820 and selects RBs within resource pool #2 in the resource pool re-selection process in step 524 as indicated by reference numeral 824.

Similarly, it is assumed that means of transportation #1 502 selects resource pool #2 for V2X communication during period #n 810 in step 520. In this case, it is assumed that means of transportation #1 502 identifies that relatively much resource pool indicating information mapped to the value "0" of MoveDirection Flag corresponding to its own movement direction is mapped to resource pool #1 from the discovery signals or the actual data signals of the other means of transportation through the V2X communication in step 522. Then, means of transportation #1 502 selects resource pool #1 as a resource pool to be used in next period #n+1 820 and selects RBs within resource #1 in the resource pool re-selection process in step 524 as indicated by reference numeral 822.

In the embodiment of FIG. 5(b), even though the resource pools are not divided according to the movement direction, each means of transportation selects the same resource pool as that to which many adjacent means of transportation having the same movement direction are allocated in a next period based on movement directions of adjacent means of transportation acquired through V2X communication, so that resource pools are dispersively allocated according to the movement direction. Accordingly, each resource pool can be gradually grouped according to the movement direction.

Meanwhile, according to another embodiment of FIG. 5(b), in D2D discovery or data signal transmission during V2X communication, some or all of pieces of information on a movement speed and a device type of the corresponding means of transportation as well as the movement direction can be also transmitted, and various forms of embodiments for selecting the resource pool based the movement direction, the movement speed, and the device type can be implemented. That is, the corresponding means of transportation can detect the movement direction, the movement speed, and the device type-related information from discovery or data signals transmitted from other means of transportation within each resource pool, and select a resource pool to which means of transportation having relevant information equal or similar to that of the corresponding means of transportation are mapped as the resource pool to be used in V2X communication of a next period.

FIG. 5(c) illustrates an example of a flowchart illustrating an operation in which the eNB directly schedules resource allocation for V2X communication of each means of transportation according to an embodiment of the present disclosure.

Referring to FIG. 5(c), for example, it is assumed that the eNB or the eNB-type RSU 506 receives a scheduling request for V2X communication from each of means of transportation #1 502 and means of transportation #2 504 in steps 528a to 528b. Then, in step 530, the eNB 506 can determine a resource pool in consideration of a movement direction of each of means of transportation #1 502 and means of transportation #2 504. At this time, it is assumed that the eNB 506 uses one of the remaining methods except for the embodiment of FIG. 4(b) among the embodiments of FIGS. 4(a) to 4(e) described above as a method of configuring movement direction information of each of means of transportation #1 502 and means of transportation #2 504. In this case, since the eNB 506 can identify in advance the movement direction of each means of transportation before the scheduling for V2X communication, the eNB 506 performs scheduling such that means of transportation having the same movement direction as that identified in advance for each of means of transportation #1 502 and means of transportation #2 504 occupy the same resource pool. According to another embodiment, when the eNB 506 configure movement direction information, such as according to the embodiment of FIG. 4(b), each of means of transportation #1 502 and means of transportation #2 504 directly determines MoveDirection Flag corresponding to its own movement direction, so that a procedure in which each of means of transportation #1 502 and means of transportation #2 504 uploads the determined MoveDirection Flag to the eNB 506 is included.

Like the embodiments of FIGS. 5(a) and 5(b), in the embodiment of FIG. 5(c), some or all of the movement speed, the device type, and the number of means of transportation moving in the same direction can be used for resource pool scheduling for V2X communication as well as the movement direction of the means of transportation according to a modified embodiment. In this case, information on the movement speed and the device type, which corresponds to additionally considered information, can be uploaded to the eNB 506 in a scheduling request process of each means of transportation in steps 528a and 528b.

Figure 9A:
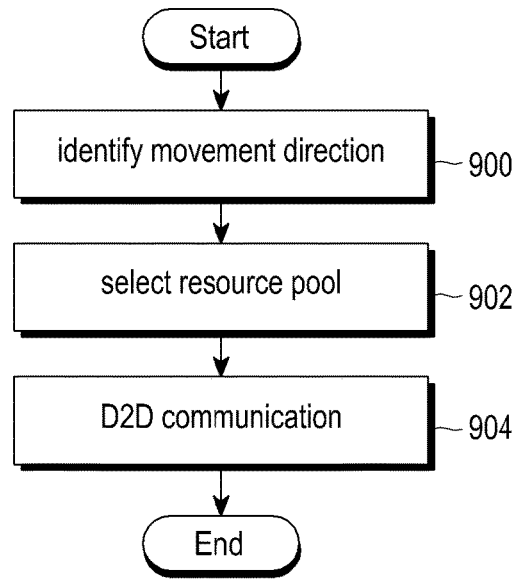
FIG. 9A is a flowchart illustrating an operation of a UE according to an embodiment of the present disclosure.
Figure 9B:
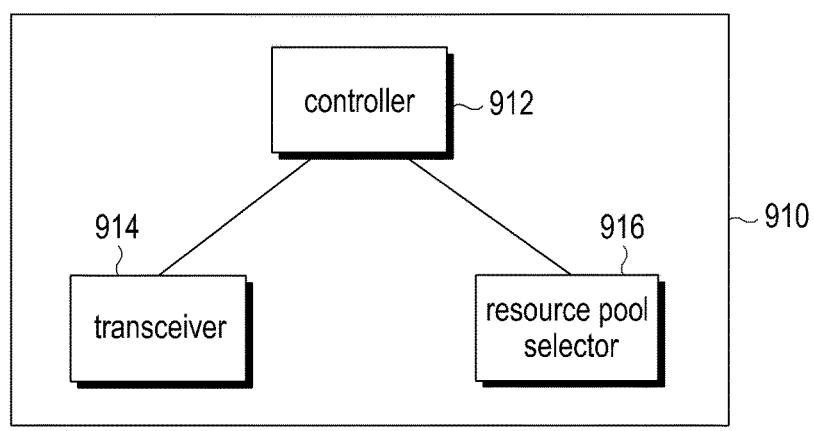
FIG. 9B is a block diagram of a UE according to an embodiment of the present disclosure.

FIG. 9A is a flowchart illustrating an operation of the UE according to an embodiment of the present disclosure. Here, the UE corresponds to an electronic device mounted to the operating means of transportation or an electronic device of a user who gets on the means of transportation according to an embodiment of the present disclosure. For example, the UE according to an embodiment of the present disclosure can be configured as illustrated in FIG. 9A. Referring to FIG. 9B, a UE 910 includes, for example, a controller 912, a transceiver 914, and a resource pool selector 916. Here, detailed elements of the UE can be integrated into one element or subdivided into further detailed elements according to some embodiments. Although only the case where the movement direction is considered when the resource pool for V2X communication is configured has been described as an example for the convenience of the description, the modified embodiment further considering the aforementioned additional information, that is, the movement speed and the device type can be applied.

Referring to FIG. 9A, in step 900, the controller 912 identifies its own movement direction. Here, an operation of identifying the movement direction of the UE can be performed according to one of the embodiments of FIGS. 4(a) to 4(e) or a combination of some embodiments, so that an overlapping description will be omitted.

Then, in step 902, the resource pool selector 916 selects a resource pool to be used in a current period. Here, the resource pool selection operation may be also performed according to one of the embodiments of FIGS. 5(a) to 5(c) or a combination of some embodiments, so that an overlapping description will be omitted.

Lastly, in step 904, the transceiver 914 performs D2D communication with a target UE by using the selected resource pool according to an embodiment of the present disclosure. Here, as the resource pool used in D2D communication, the resource pool selected from one of the embodiments of FIGS. 5(a) to 5(c) or the combination of some embodiments is used.

Figure 10A:
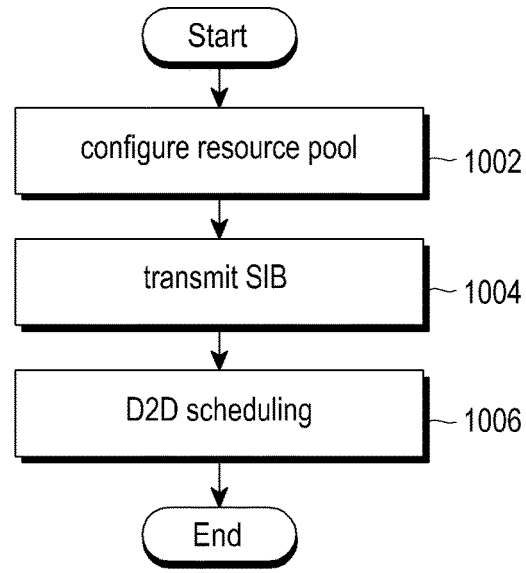
FIG. 10A is a flowchart illustrating an operation of an eNB according to an embodiment of the present disclosure.
Figure 10B:
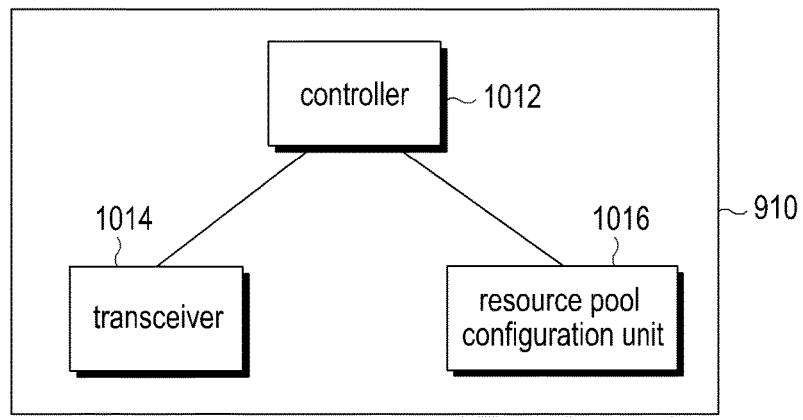
FIG. 10B is a block diagram of an eNB according to an embodiment of the present disclosure.

FIG. 10A is a flowchart illustrating an operation of the eNB according to an embodiment of the present disclosure. Here, the eNB corresponds to the RSU or the eNB-type RSU according to an embodiment of the present disclosure. For example, the eNB according to an embodiment of the present disclosure can be configured as illustrated in FIG. 10B. Referring to FIG. 10B, an eNB 1010 includes, for example, a controller 1012, a transceiver 1014, and a resource pool configuration unit 1016. Here, detailed elements of the eNB can be integrated into one element or subdivided into further detailed elements according to some embodiments. Although only the case where the movement direction is considered when the resource pool for V2X communication is configured has been described as an example for the convenience of the description, the modified embodiment further considering the aforementioned additional information, that is, the movement speed and the device type can be applied.

Referring to FIG. 10A, in step 1002, the resource pool configuration unit 1016 configures a resource pool based on an instruction of the controller 1012 according to an embodiment of the present disclosure. Here, the resource pool configuration operation of the eNB may be also performed according to one of the embodiments of FIGS. 5(a) to 5(c) or a combination of some embodiments, so that an overlapping description will be omitted. In step 1004, the transceiver 1014 broadcasts an SIB configured according to an embodiment based on the instruction of the controller 1012. At this time, the configured SIB can include location information of the resource pool configured according to the embodiments of FIGS. 5(a) to 5(b) and the values of MoveDirection Flag mapped according thereto. Alternatively, only the location information of the resource pool allocated according to the embodiment of FIG. 5(c) can be transmitted, or the location information of the resource pool mapped according to the movement speed and the device type according to a modified example of the embodiment can be transmitted.

In step 1006, the transceiver 1014 allocates the resource pool to the corresponding means of transportation according to one of the embodiments of FIGS. 5(a) to 5(c) or a combination of some embodiments.

As described above, according to embodiments of the present disclosure, the scheduling is made such that means of transportation having the same movement direction occupy the same resource pool in V2X communication in consideration of the movement direction of the means of transportation, thereby reducing ICI generated due to a difference in the movement speed between means of transportation. Particularly, when the embodiment of the present disclosure is applied to a situation where each means of transportation receives a signal transmitted from a means of transportation moving in the same direction and recognizes a state on the road ahead or relays accident danger to a means of transportation behind, reliability of a received signal can be increased in communication between the means of transportation moving in the same direction. Further, embodiments of the present disclosure can be implemented in various forms by further sub-dividing and configuring resource pools in consideration of some or all of pieces of additional information such as the movement speed and the device type, as well as the movement direction.

Particular aspects of the present disclosure can be implemented as a computer-readable code in a computer-readable recording medium. The computer-readable recording medium is a predetermined data storage device which can store data which can be read by a computer system. Examples of the computer readable recording medium can include a read-only memory (ROM), a random access memory (RAM), a CD-ROM, a magnetic tape, a floppy disk, an optical data storage device, and a carrier wave (such as data transmission through the Internet). The computer-readable recording medium can be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure can be implemented in the form of hardware, software, or a combination of hardware and software. Any such software can be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It will also be understood that a method and apparatus according to an embodiment of the present disclosure can be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program can be electronically carried by any medium such as a communication signal transferred through a wired or wireless connection, and the present disclosure appropriately includes equivalents thereof.

Further, an apparatus according to an embodiment of the present disclosure may receive the program from a program providing device that is connected via a wired or wireless connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of performing D2D communication by a user equipment (UE), the method comprising:
receiving, from an evolved Node B (eNB), information indicating a plurality of resource pools allocated for D2D communication, wherein the plurality of resource pools are mapped differently to a plurality of movement directions and configured to allocate UEs having an equal movement direction to an equal resource pool;
identifying a movement direction of the UE; and
selecting a resource pool mapped to the identified movement direction from among the plurality of resource pools.

2. The method of claim 1, wherein selecting the resource pool comprises selecting a resource pool to which additional information of the UE is mapped among the plurality of resource pools divided according to a combination including at least one of predetermined movement speed or device type as the resource pool mapped according to the movement direction.

3. The method of claim 1, wherein identifying the movement direction of the UE comprises mapping the identified movement direction of the UE among flag values mapped according to a predetermined movement direction or receiving a flag value to which the identified movement direction of the UE is mapped from an evolved Node B (eNB).

4. The method of claim 1, wherein identifying the movement direction of the UE comprises receiving movement direction indicating information of the UE from a communication network server, and the movement direction indicating information is determined using at least one of a location measurement coordinate, received signal intensities of adjacent evolved Node Bs (eNBs) that the UE receives, and a handover history of the UE.

5. The method of claim 1, further comprising:
transmitting movement direction indicating information of the UE and receiving movement direction indicating information of other UEs in a D2D communication;
re-selecting a resource pool to which a number of other UEs larger than or equal to a predetermined threshold value that have movement direction indicating information equal to movement direction indicating information of the UE among resource pools allocated in a current period based on information on a resource pool received from the eNB; and
performing the D2D communication in a next period by using the re-selected resource pool.

6. A method of allocating resources for D2D communication by an evolved Node B (eNB), the method comprising:
acquiring a movement direction according to a user equipment (UE);
allocating UEs having an equal movement direction to an equal resource pool by using the acquired movement direction according to the UE; and
transmitting information related to the resource pool to the UEs,
wherein allocating the UEs having the equal movement direction to the equal resource pool comprises:
allocating the resource pool according to a predetermined movement direction, and
allocating a resource pool mapped to a movement direction equal to the acquired movement direction according to the UE as the resource pool of a corresponding UE.

7. The method of claim 6, wherein acquiring the movement direction according to the UE comprises transmitting a predetermined movement direction indicator to another UE entering a service coverage or receiving the predetermined movement direction indicator from a corresponding UE.

8. The method of claim 6, wherein acquiring the movement direction according to the UE comprises measuring a location measurement coordinate of each of a number of UEs and determining a movement direction of a corresponding UE by using at least one of received signal intensities of adjacent eNBs that the corresponding UE receives and a handover history of the corresponding UE.

9. The method of claim 6, further comprising, when a scheduling request is received from at least one UE to perform direct communication:
allocating a resource pool to which UEs having a movement direction equal to the movement direction of the at least one UE to the at least one UE; and
transmitting information on the resource pool allocated to the at least one UE.

10. The method of claim 6, wherein allocating the UEs having the equal movement direction to the equal resource pool comprises:
sub-dividing and allocating the resource pool according to a predetermined movement direction based on a combination including at least one piece of additional information such as predetermined movement speed and device type; and
identifying additional information of the UEs and selecting a resource pool to which the combination of the additional information of a corresponding UE is mapped among the sub-divided resource pools.

11. A user equipment (UE) for allocating resources for D2D communication, the UE comprising:
a transceiver configured to:
receive, from an evolved Node B (eNB), information indicating a plurality of resource pools allocated for D2D communication, wherein the plurality of resource pools are mapped differently to a plurality of movement directions and configured to allocate UEs having an equal movement direction to an equal resource pool, and
a controller configured to:
identify a movement direction of the UE; and
select a resource pool mapped according to the identified movement direction from among a plurality of resource pools allocated differently according to a plurality of movement directions, wherein the plurality of resource.

12. The UE of claim 11, wherein the controller selects a resource pool to which additional information of the UE is mapped among the plurality of resource pools divided according to a combination including at least one piece of additional information, such as a predetermined movement speed and a device type, as the resource pool mapped according to the movement direction.

13. The UE of claim 11, wherein the controller maps the identified movement direction of the UE among flag values mapped according to a predetermined movement direction or identifies a flag value, to which the identified movement direction of the UE is mapped, received from the eNB through the transceiver.

14. The UE of claim 11, wherein the transceiver receives movement direction indicating information of the UE from a communication network server, and the movement direction indicating information is determined using at least one of a location measurement coordinate, received signal intensities of adjacent evolved Node Bs (eNBs) that the UE receives, and a handover history of the UE.

15. The UE of claim 11, wherein
the transceiver transmits movement direction indicating information of the UE in the D2D communication, and,
when movement direction indicating information of other UEs is received, the controller:
re-selects a resource pool to which a number of other UEs larger than or equal to a predetermined threshold value that have movement direction indicating information equal to movement direction indicating information of the UE are allocated among resource pools allocated in a current period based on information on a resource pool received from the eNB, and
controls the transceiver to perform the D2D communication in a next period by using the re-selected resource pool.

16. An evolved node B (eNB) for allocating resources for D2D communication, the eNB comprising:
a controller configured to:
acquire a movement direction according to a user equipment (UE), and
allocate UEs having an equal movement direction to an equal resource pool by using the acquired movement direction according to the UE; and
a transceiver configured to transmit information related to the resource pool to the UEs according to an instruction of the controller,
wherein the controller is further configured to:
allocate a resource pool according to a predetermined movement direction, and
allocate a resource pool mapped to a movement direction equal to the acquired movement direction according to the UE as the resource pool of a corresponding UE.

17. The eNB of claim 16, wherein the transceiver transmits a predetermined movement direction indicator to a UE entering a service coverage or receives the predetermined movement direction indicator from a corresponding UE.

18. The eNB of claim 16, wherein the controller measures a location measurement coordinate of each of the UEs and determines a movement direction of a corresponding UE by using at least one of received signal intensities of adjacent eNBs which the UE receives and a handover history of the UE.

19. The eNB of claim 16, wherein, when a scheduling request is received from at least one UE to perform direct communication, the controller allocates a resource pool to which UEs having a movement direction equal to the movement direction of the at least one UE to the at least one UE and controls the transceiver to transmit information on the resource pool allocated to the at least one UE.

20. The eNB of claim 16, wherein the controller subdivides and allocates the resource pool according to a predetermined movement direction based on a combination including at least one piece of additional information such as predetermined movement speed and device type, identifies additional information of the UEs, and selects a resource pool to which the combination of the additional information of a corresponding UE is mapped among the sub-divided resource pools.

* * * * *